(12) United States Patent
Chang et al.

(10) Patent No.: US 8,406,703 B2
(45) Date of Patent: Mar. 26, 2013

(54) SLIDING HINGE AND A PORTABLE DEVICE WITH THE SLIDING HINGE

(75) Inventors: Chih-Cheng Chang, Shulin (TW);
Cheng-Syue Wu, Shulin (TW);
Ruei-Lin Jhu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 365 days.

(21) Appl. No.: 12/925,471

(22) Filed: Oct. 22, 2010

(65) Prior Publication Data
US 2012/0098397 A1 Apr. 26, 2012

(51) Int. Cl.
*H04M 1/00* (2006.01)
(52) U.S. Cl. ..................................................... 455/90.3
(58) Field of Classification Search .................... 16/277; 361/679.01, 679.55, 679.56, 679.3, 679.02, 361/679.21, 679.26, 679.27; 379/433.12, 379/433.13, 433.11; 455/575.4, 575.1, 90.3; 267/141, 160, 182
See application file for complete search history.

(56) References Cited

U.S. PATENT DOCUMENTS

| | | | |
|---|---|---|---|
| 7,774,033 B2 * | 8/2010 | Lee ............................ | 455/575.4 |
| 7,779,509 B2 * | 8/2010 | Jian ............................ | 16/359 |
| 7,801,580 B2 * | 9/2010 | Cho et al. .................... | 455/575.4 |
| 7,822,447 B2 * | 10/2010 | Kim ............................ | 455/575.4 |
| 7,885,055 B2 * | 2/2011 | Park et al. ................... | 361/679.01 |
| 7,966,049 B2 * | 6/2011 | Jang ............................ | 455/575.4 |
| 7,979,100 B2 * | 7/2011 | Tang ........................... | 455/575.4 |
| 8,113,493 B2 * | 2/2012 | Shen ........................... | 267/70 |
| 8,121,660 B2 * | 2/2012 | Park et al. ................... | 455/575.4 |
| 8,131,330 B2 * | 3/2012 | Kim et al. .................... | 455/575.4 |
| 8,213,169 B2 * | 7/2012 | Chen et al. .................. | 361/679.27 |
| 8,259,931 B2 * | 9/2012 | Wu et al. ..................... | 379/433.12 |
| 8,265,720 B2 * | 9/2012 | Ahn et al. .................... | 455/575.4 |
| 2006/0180457 A1 * | 8/2006 | Han et al. .................... | 200/550 |
| 2006/0205450 A1 * | 9/2006 | Amano et al. ............... | 455/575.4 |
| 2007/0060220 A1 * | 3/2007 | Hsu ............................. | 455/575.4 |
| 2007/0105605 A1 * | 5/2007 | Park et al. ................... | 455/575.4 |
| 2007/0155451 A1 * | 7/2007 | Lee ............................. | 455/575.4 |
| 2007/0218963 A1 * | 9/2007 | Kim ............................ | 455/575.4 |

(Continued)

FOREIGN PATENT DOCUMENTS
JP 2006270804 * 10/2006
WO 2009145558 * 12/2009
(Continued)

OTHER PUBLICATIONS
201994986 CN Chen Sep. 2011 abs and drawing.*

*Primary Examiner* — Janet M Wilkens
(74) *Attorney, Agent, or Firm* — Alan Kamrath; Kamrath IP Lawfirm, P.A.

(57) ABSTRACT

A portable device has lower and upper casings. A sliding hinge has a stationary frame attached to the lower casing, a sliding frame attached to the upper casing and a resilient positioning assembly mounted between the stationary and sliding frames. The sliding frame has multiple pushing pins protruding toward the stationary frame. The resilient positioning assembly has two sliders and multiple resilient elements disposed between and abutting the sliders. When the upper casing slides relative to the lower casing, the pushing pins move along and push corresponding sliders and pressing the resilient elements. As long as the pushing pins are moved to the other sides of the corresponding sliders, the resilient elements push the sliders back and the upper and lower casings of the portable device are open relative to each other.

15 Claims, 8 Drawing Sheets

U.S. PATENT DOCUMENTS

| | | | |
|---|---|---|---|
| 2007/0249394 A1* | 10/2007 | Bong Doo | 455/556.1 |
| 2008/0058039 A1* | 3/2008 | Lee et al. | 455/575.4 |
| 2008/0207284 A1* | 8/2008 | Jung et al. | 455/575.4 |
| 2008/0250606 A1* | 10/2008 | Peng et al. | 16/353 |
| 2008/0254844 A1* | 10/2008 | Lee | 455/575.4 |
| 2009/0069059 A1* | 3/2009 | Min et al. | 455/575.4 |
| 2010/0234080 A1* | 9/2010 | Holman et al. | 455/575.4 |
| 2011/0072922 A1* | 3/2011 | Cho | 74/100.2 |
| 2012/0157172 A1* | 6/2012 | Chang et al. | 455/575.4 |
| 2012/0238332 A1* | 9/2012 | Mai et al. | 455/575.4 |

FOREIGN PATENT DOCUMENTS

| | | | |
|---|---|---|---|
| WO | 2009154373 | * | 12/2009 |

* cited by examiner

SLIDING HINGE AND A PORTABLE DEVICE WITH THE SLIDING HINGE

BACKGROUND OF THE INVENTION

1. Field of the Invention

The present invention relates to a sliding hinge, especially to a sliding hinge that is mounted in a portable device so an upper casing of the portable device slides relative to a lower casing of the portable device.

2. Description of the Prior Art(s)

Due to the progression of technology, portable personal electronic devices, such as mobile phones, personal digital assistants (PDAs) and the like, have more and more new functions and slimmer and lighter appearances. In order to have a simplified volume for the convenience of carriage and storage, the portable device comprises a base having a keypad and a cover having a screen, and the base and the cover of the portable device may flip, swivel or slide relative to each other.

A conventional slider device mostly has a resilient positioning assembly, like a torque spring, having two ends connected respectively to the base and the cover. When the cover slides relative to the base, the resilient positioning assembly pulls to hold the cover close or open relative to the base. The conventional slider device may not capable of being used for thousands of times. Therefore, designing a new sliding hinge for the slider device to provide a new style slider device is a necessity.

To overcome the shortcomings, the present invention provides a sliding hinge and a portable device with the sliding hinge to mitigate or obviate the aforementioned problems.

SUMMARY OF THE INVENTION

The main objective of the present invention is to provide a sliding hinge and a portable device with the sliding hinge. The portable device has a lower casing and an upper casing. The sliding hinge is mounted between the lower casing and the upper casing, and has a stationary frame attached to the lower casing, a sliding frame attached to the upper casing and a resilient positioning assembly mounted between the stationary and sliding frames. The sliding frame has multiple pushing pins protruding toward the stationary frame. The resilient positioning assembly has two sliders and multiple resilient elements disposed between and abutting the sliders. When the upper casing slides relative to the lower casing, the pushing pins move along and push corresponding sliders and pressing the resilient elements. As long as the pushing pins are moved to the other sides of the corresponding sliders, the resilient elements push the sliders back and the upper and lower casings of the portable device are open relative to each other.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
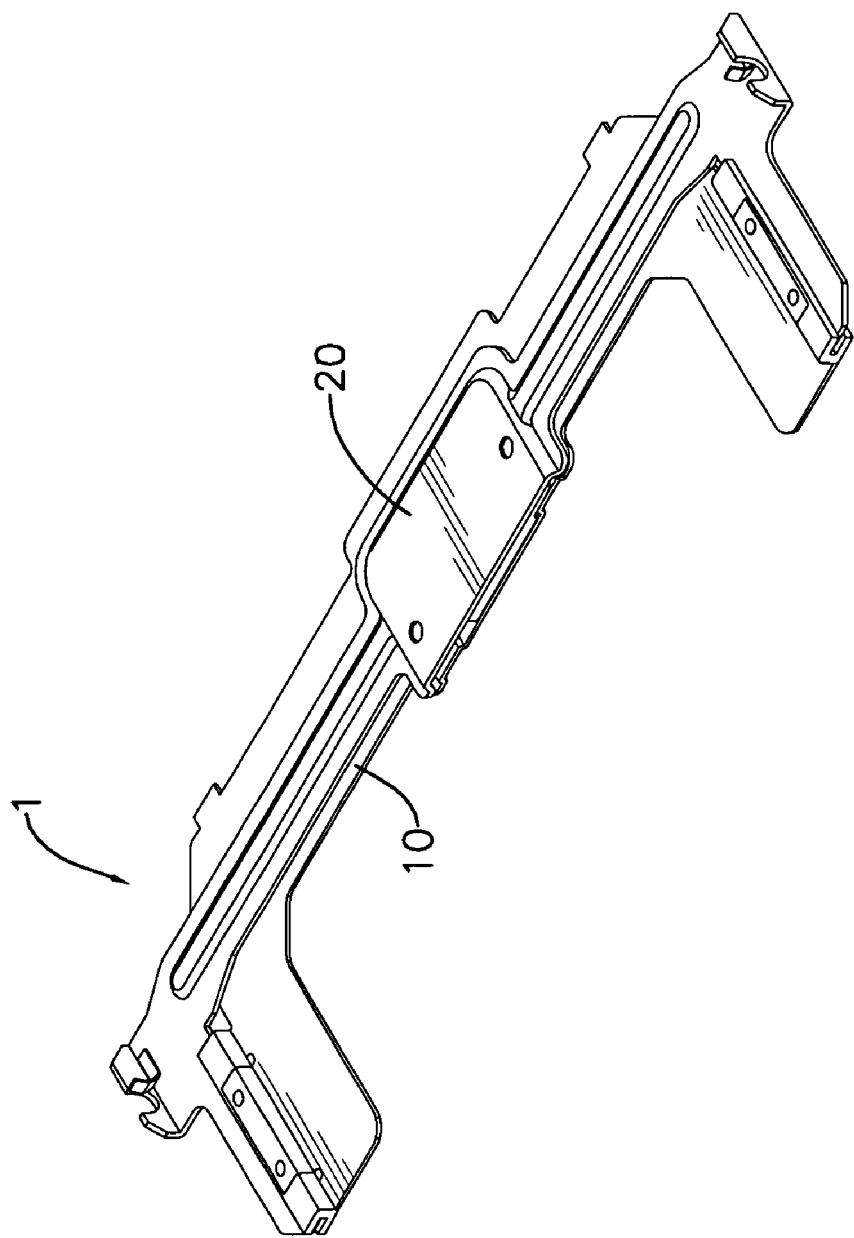
FIG. 1 is a perspective view of a sliding hinge in accordance with the present invention.
Figure 2:
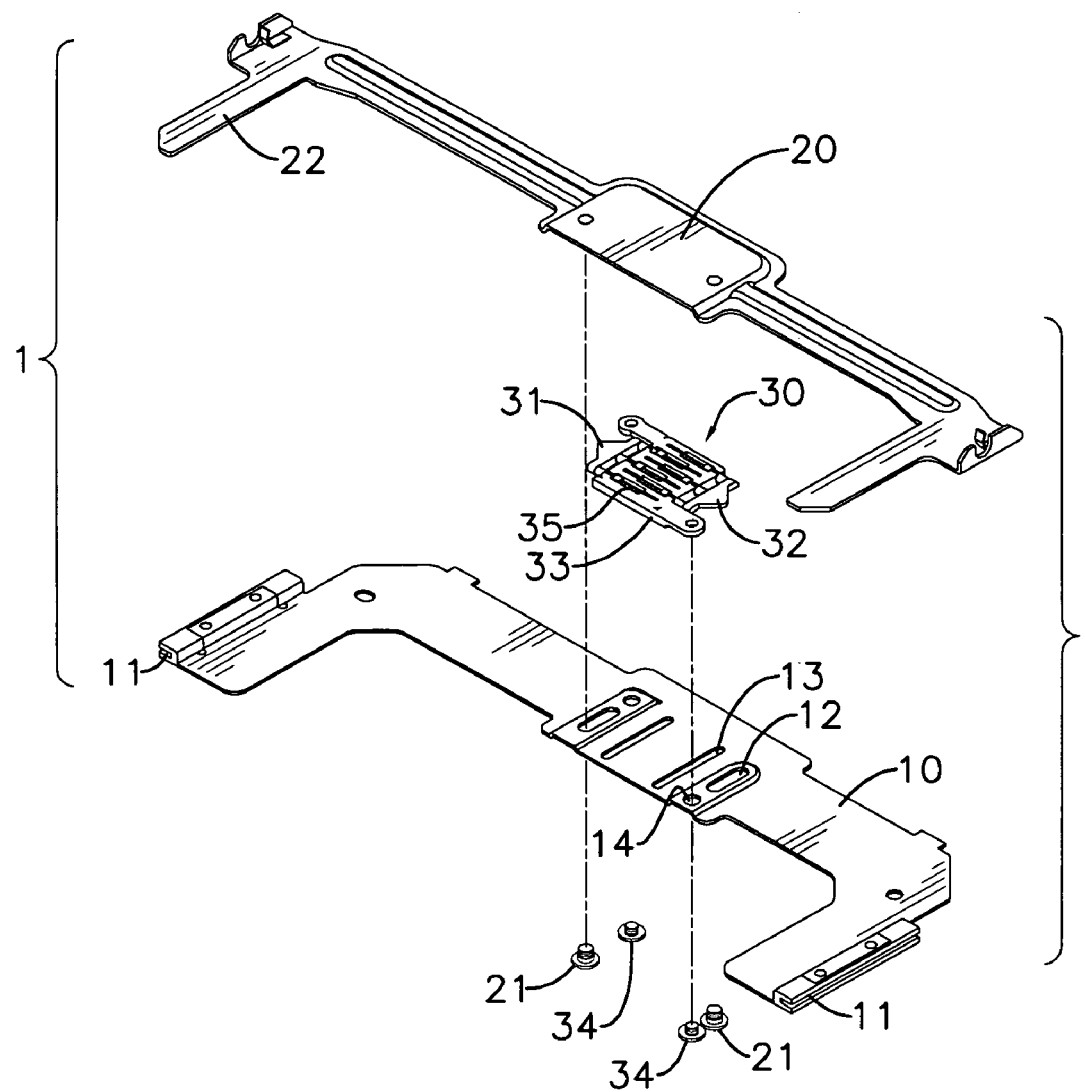
FIG. 2 is an exploded perspective view of the sliding hinge in FIG. 1.
Figure 6:
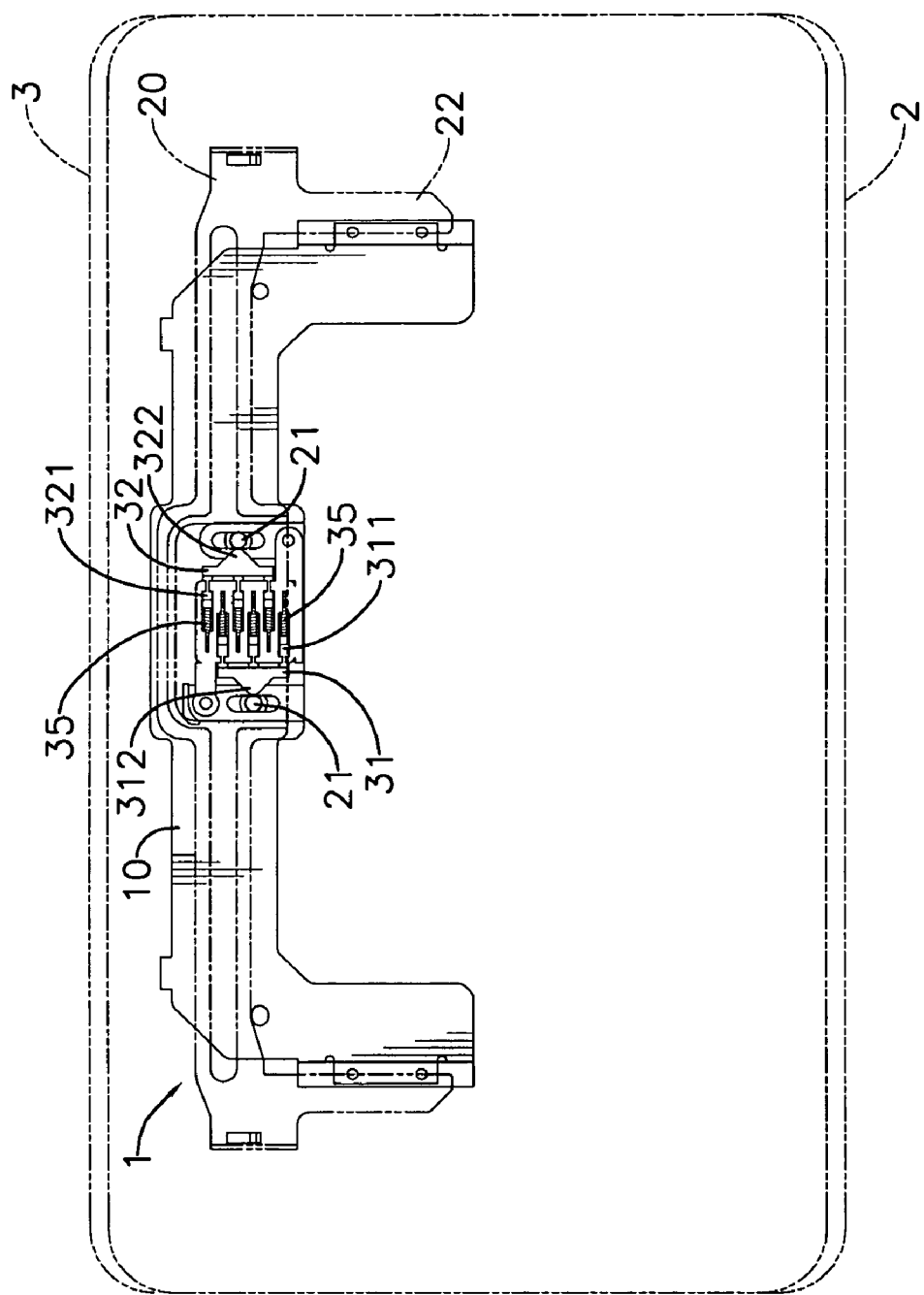
FIG. 6 is a top view of the portable device in FIG. 5, shown open and the lower casing and an upper casing of the portable device shown in phantom lines.

With reference to FIG. 6, a portable device in accordance with the present invention comprises a lower casing 2, an upper casing 3 and a sliding hinge 1 in accordance with the present invention. With further reference to FIGS. 1 and 2, the sliding hinge 1 comprises a stationary frame 10, a sliding frame 20 and a resilient positioning assembly 30.

The stationary frame 10 is attached securely to the lower casing 2 and has at least one guiding recess 11, at least one positioning portion 13 and at least one through hole 14. The at least one guiding recess 11 is formed on at least one side edge of the stationary frame 10. The at least one positioning portion 13 of the stationary frame 10 is formed on the stationary frame 10. The at least one through hole 14 is formed through the stationary frame 10.

The sliding frame 20 is mounted on the stationary frame 10, is attached securely to the upper casing 3 and has an inner surface, at least one pushing pin 21 and at least one guiding protrusion 22. The inner surface of the sliding frame 20 corresponds to the stationary frame 10. The at least one pushing pin 21 is mounted on the inner surface of the sliding frame 20. The at least one guiding protrusion 22 is formed on at least one side edge of the sliding frame 20 and is mounted slidably in the at least one guiding recess 11 of the stationary frame 10. Thus, as the sliding frame 20 slides relative to the stationary frame 10, the at least one guiding protrusion 22 of the sliding frame 20 slides along the at least one guiding recess 11 of the stationary frame 10.

Preferably, the stationary frame 10 has two guiding recesses 11 formed respectively on two opposite side edges of the stationary frame 10. The sliding frame 20 has two guiding protrusions 22 formed respectively on two opposite side edges of the sliding frame 20 and respectively mounted slidably in the guiding recesses 11 of the stationary frame 10. Therefore, the sliding frame 20 stably slides relative to the stationary frame 10.

Figure 3:
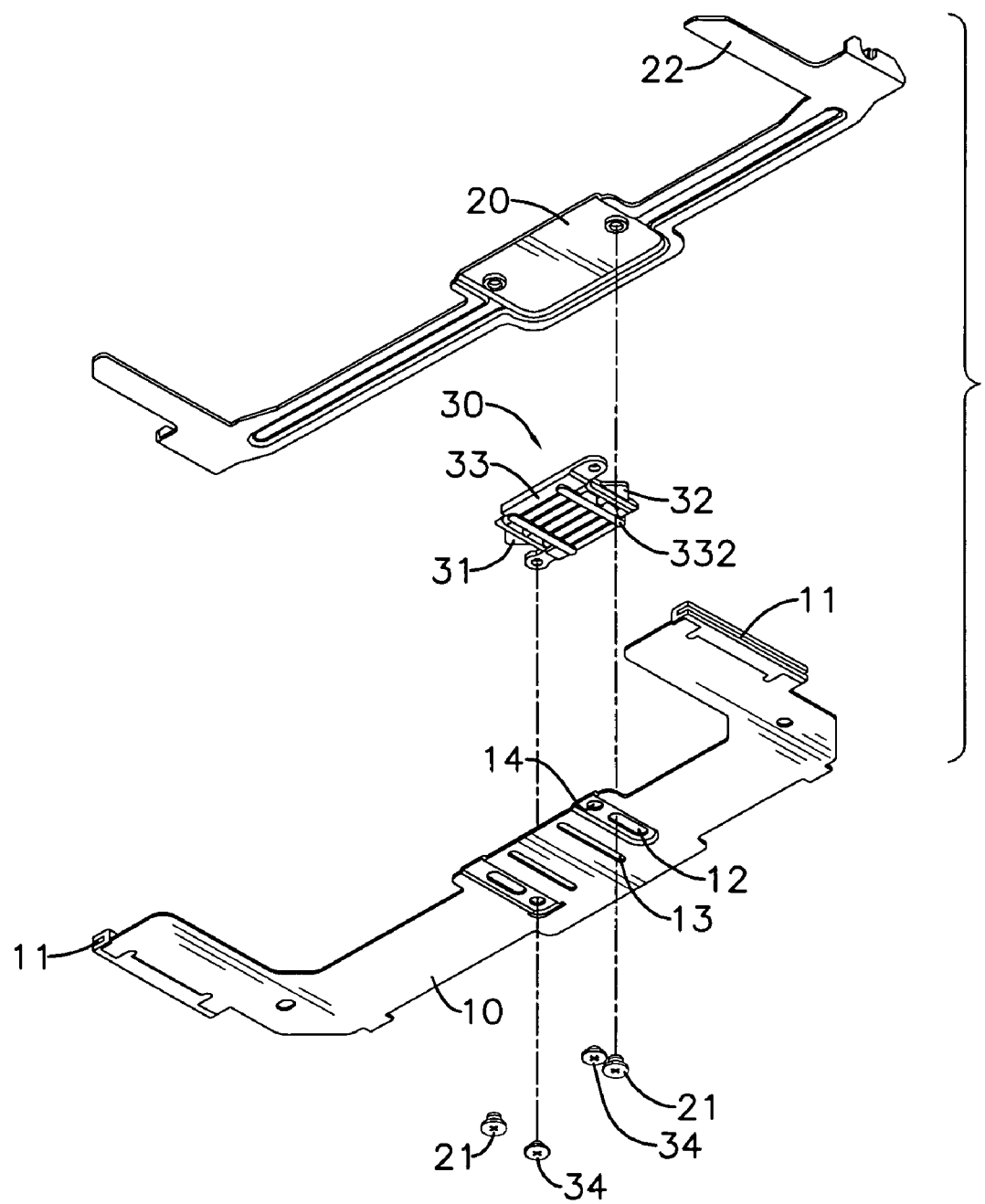
FIG. 3 is another exploded perspective view of the sliding hinge in FIG. 1.
Figure 4:
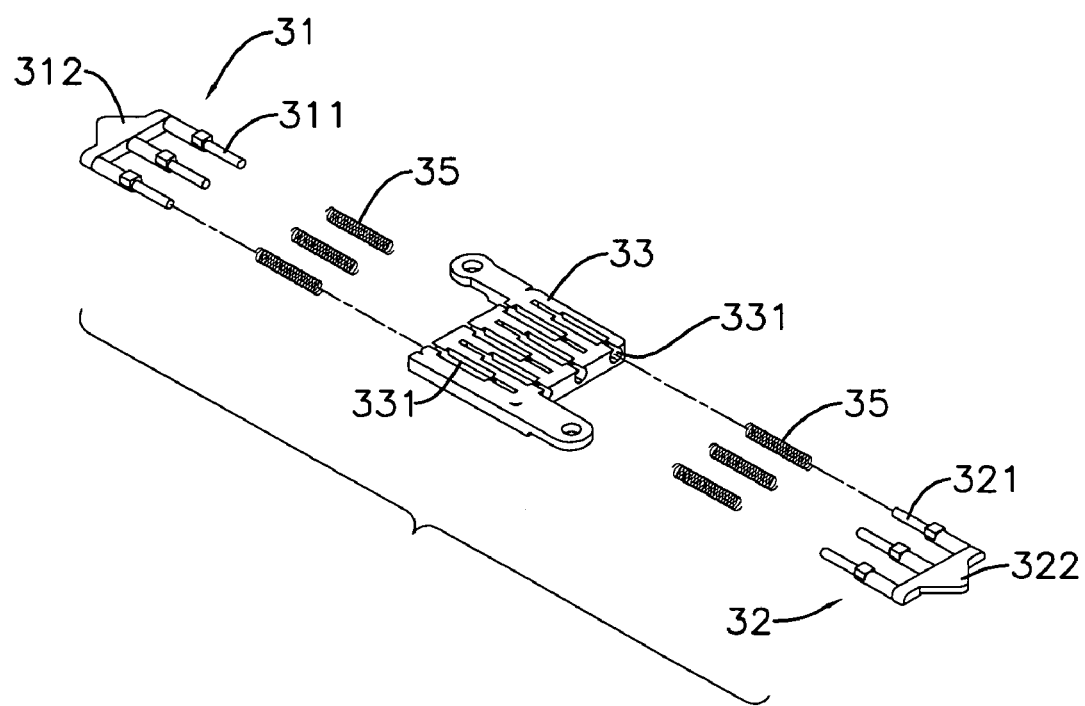
FIG. 4 is an enlarged exploded perspective view of a resilient position assembly of the sliding hinge in FIG. 1.

With further reference to FIGS. 3 and 4, the resilient positioning assembly 30 is mounted on the stationary frame 10, is disposed between the stationary frame 10 and the sliding frame 20 and has a mounting bracket 33, at least one fastener 34, a first slider 31 and multiple resilient elements 35.

The mounting bracket 33 is mounted securely on the stationary frame 10 and has at least one side surface, multiple mounting recesses 331 and at least one position portion 332. The at least one side surface of the mounting bracket 33 corresponds to the at least one pushing pin 21. The mounting recesses 331 are formed in the at least one side surface of the mounting bracket 33. The at least one positioning portion 332 of the mounting bracket 33 is formed on a lower surface of the mounting bracket 33 and engages the at least one positioning portion 13 of the stationary frame 10 to mount the mounting bracket 33 at a specific position of the stationary frame 10.

The at least one fastener 34 is mounted through the at least one through hole 14 of the stationary frame 10 and is fastened to the mounting bracket 33 so the mounting bracket 33 is held securely on the stationary frame 10.

The first slider 31 is mounted on one of the at least one side surface of the mounting bracket 33, is disposed between the mounting bracket 33 and the at least one pushing pin 21 and has multiple mounting rods 311 and a pushing protrusion 312. The mounting rods 311 of the first slider 31 separately protrude from a side surface of the first slider 31 and are mounted respectively in the mounting recesses 331 of the mounting bracket 33. The pushing protrusion 312 of the first slider 31 is formed on another side surface of the first slider 31 and abuts a corresponding pushing pin 21 of the sliding frame 20.

The resilient elements 35 are mounted respectively around the mounting rods 311 of the first slider 31. Each resilient element 35 has two ends respectively abutting the mounting bracket 33 and the first slider 31.

Preferably, the stationary frame 10 further has two sliding slots 12 formed separately through the stationary frame 10 and extending parallel to the at least one guiding recess 11 of the stationary frame 10. The sliding frame 20 has two pushing pins 21 slidably mounted respectively through the sliding slots 12 of the stationary frame 10. The mounting bracket 33 is disposed between the pushing pins 21 of the sliding frame 20 and has two opposite side surfaces respectively corresponding to the pushing pins 21. The mounting recesses 331 of the mounting bracket 33 are formed in the side surfaces of the mounting bracket 33. The resilient positioning assembly 30 further has a second slider 32. The first slider 31 and the second slider 32 are mounted respectively on the side surfaces of the mounting bracket 33 and are disposed respectively between the mounting bracket 33 and the pushing pins 21. The second slider 32 has multiple mounting rods 321 and a pushing protrusion 322. The mounting rods 321 of the second slider 32 separately protrude from a side surface of the second slider 32 and are mounted respectively in the mounting recesses 331 of the mounting bracket 33. The pushing protrusion 322 of the second slider 32 is formed on another side surface of the second slider 32 and abuts a corresponding pushing pin 21 of the sliding frame 20. The resilient elements 35 of the resilient positioning assembly 30 are mounted respectively around the mounting rods 311, 321 of the first and second sliders 31, 32, and the ends of each resilient element 35 respectively abutting the mounting bracket 33 and a corresponding slider 31, 32.

Figure 7:
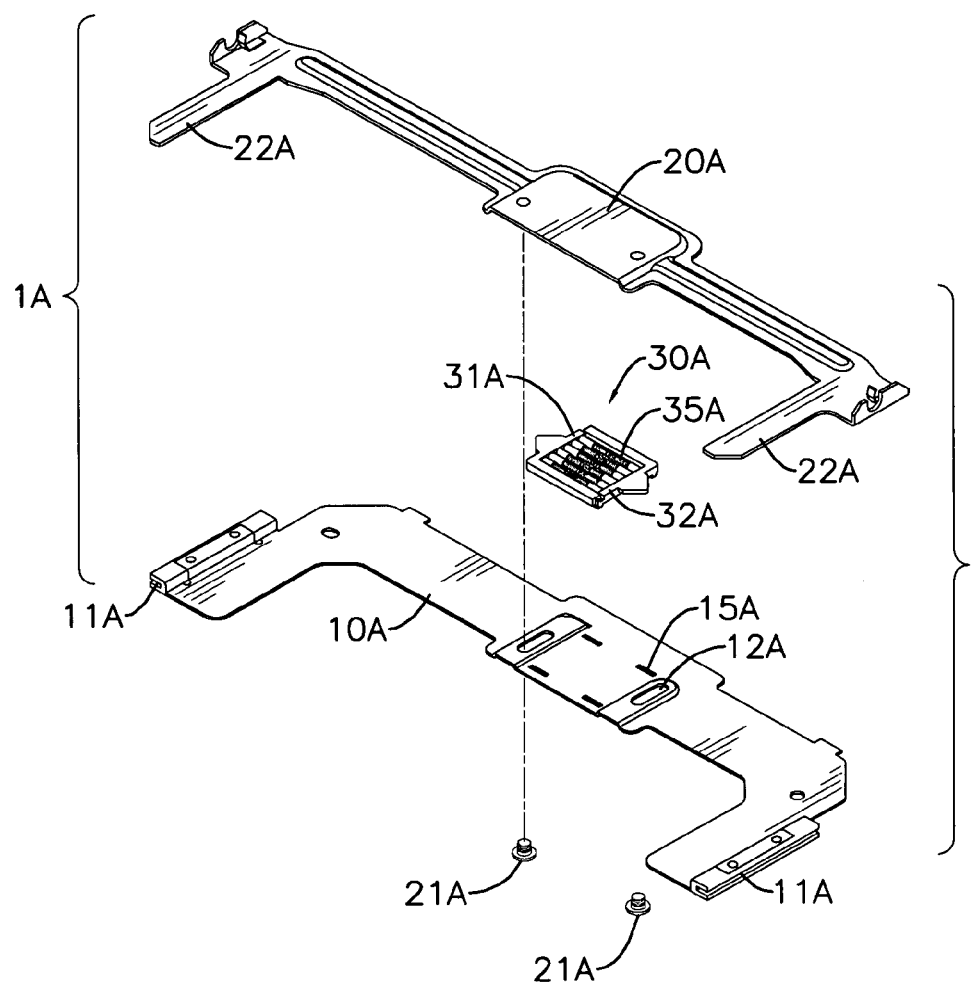
FIG. 7 is an exploded perspective view of another embodiment of a sliding hinge in accordance with the present invention.

With reference to FIG. 7, another preferred embodiment of the sliding hinge 1A comprises a stationary frame 10A, a sliding frame 20A and a resilient positioning assembly 30A.

The stationary frame 10A is attached securely to the lower casing 2 and has at least one guiding recess 11A, multiple guiding slots 15A. The guiding recess 11A is formed on at least one side edge of the stationary frame 10A. The guiding slots 15A are formed separately through the stationary frame 10A.

The sliding frame 20A is mounted on the stationary frame 10A, is attached securely to the upper casing 3 and has an inner surface, at least one pushing pin 21A and at least one guiding protrusion 22A. The inner surface of the sliding frame 20A corresponds to the stationary frame 10A. The at least one pushing pin 21A is mounted on the inner surface of the sliding frame 20A. The at least one guiding protrusion 22A is formed on at least one side edge of the sliding frame 20A and is mounted slidably in the at least one guiding recess 11A of the stationary frame 10A.

Figure 8:
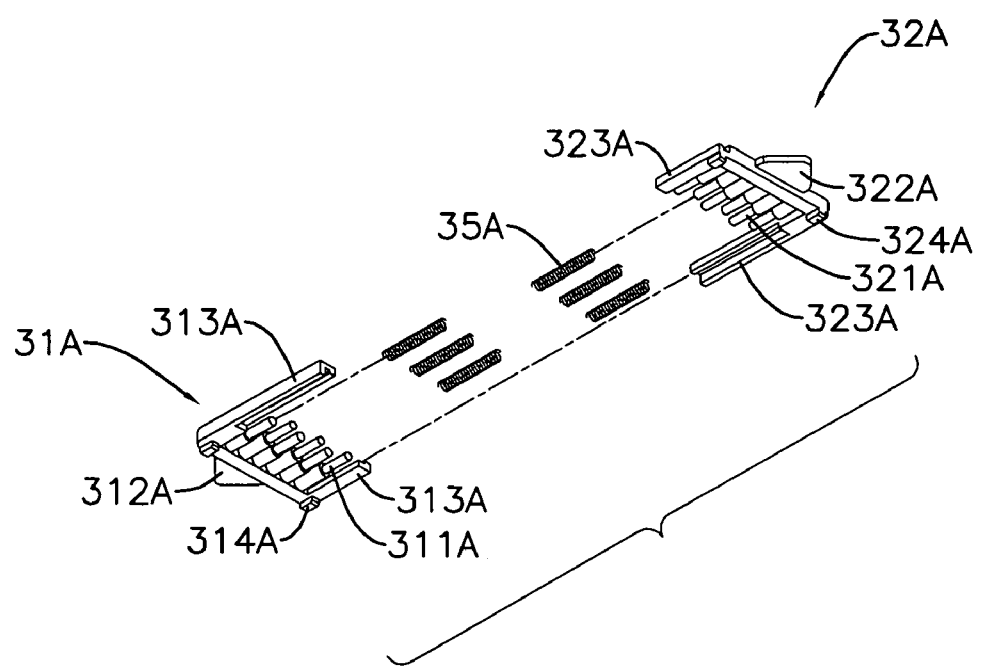
FIG. 8 is an enlarged exploded perspective view of a resilient position assembly of the sliding hinge in FIG. 7.

With further reference to FIG. 8, the resilient positioning assembly 30A is mounted on the stationary frame 10A, is disposed between the stationary frame 10A and the sliding frame 20A and has a first slider 31A, a second slider 32A and multiple resilient elements 35A.

The first slider 31A is mounted slidably on the stationary frame 10A and has multiple mounting rods 311A, a pushing protrusion 312A and at least one sliding protrusion 314A. The mounting rods 311A of the first slider 31A separately protrude from a side surface of the first slider 31A. The pushing protrusion 312A of the first slider 31A is formed on another side surface of the first slider 31A and abuts a corresponding pushing pin 21A of the sliding frame 20A. The at least one sliding protrusion 314A of the first slider 31A is formed on a bottom of the first slider 31A and is mounted slidably in at least one corresponding guiding slot 15A of the stationary frame 10A.

The second slider 32A is mounted slidably on the stationary frame 10A.

The resilient elements 35A are mounted respectively around the mounting rods 311A of the first slider 31A. Each resilient element 35A has two ends respectively abutting the first and second sliders 31A, 32A.

Preferably, the stationary frame 10A further has two sliding slots 12A formed separately through the stationary frame 10A, and extending parallel to the guiding recess 11A of the stationary frame 10A and perpendicular to the guiding slots 15A of the stationary frame 10A. The sliding frame 20A has two pushing pins 21A mounted respectively through the sliding slots 12A of the stationary frame 10A. The first slider 31A of the resilient positioning assembly 30A further has two guiding rods 313A respectively formed opposite by the mounting rods 311A of the first slider 31A. The second slider 32A of the resilient positioning assembly 30A has multiple mounting rods 321A, a pushing protrusion 322A, two guiding rods 323A and at least one sliding protrusion 324A. The mounting rods 321A of the second slider 32A separately protrude from a side surface of the second slider 32A. The pushing protrusion 322A of the second slider 32A is formed on another side surface of the second slider 32A and abuts a corresponding pushing pin 21A of the sliding frame 20A. The guiding rods 323A of the second slider 32A are respectively formed opposite by the mounting rods 321A of the second slider 32A, and overlap and engage corresponding guiding rods 313A of the first slider 31A to allow the first and second sliders 31A, 32A to slide along the guiding rods 313A, 323A of the first and second sliders 31A, 32A. The at least one sliding protrusion 324A of the second slider 32A is formed on a bottom of second slider 32A and is mounted slidably in at least one corresponding guiding slot 15A of the stationary frame 10A. The resilient elements 35A of the resilient positioning assembly 30A are mounted respectively around the mounting rods 311A, 321A of the first and second sliders 31A, 32A. The ends of each resilient element 35A respectively abut the first and second sliders 31A, 32A.

Figure 5:
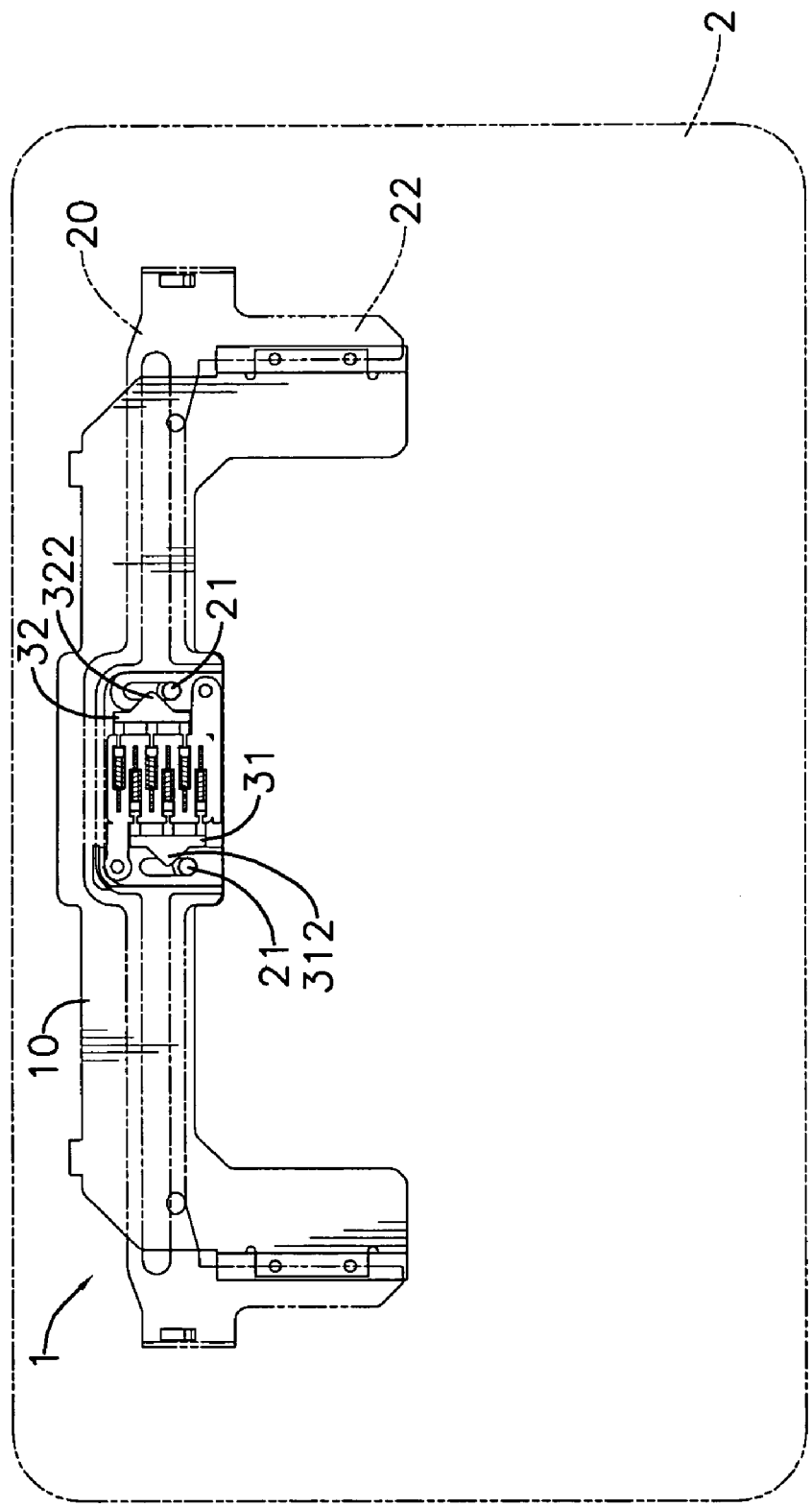
FIG. 5 is a top view of a portable device in accordance with the present invention, shown closed and a lower casing of the portable device shown in phantom lines.

With further reference to FIG. 5, when the lower casing 2 and the upper casing 3 of the portable device is closed relatively to each other, each pushing pin 21, 21A of the sliding frame 20, 20A is disposed at one side of the pushing protrusion 312, 322, 312A, 322A of the corresponding slider 31, 32, 31A, 32A.

With further reference to FIG. 6, when the upper casing 3 slides relative to the lower casing 2, the pushing pins 21, 21A of the sliding frame 20, 20A move along and push the pushing protrusions 312, 322, 312A, 322A of the first and second sliders 31, 32, 31A, 32A and the resilient elements 35, 35A are pressed. As long as the pushing pins 21, 21A of the sliding frame 20, 20A are moved to the other sides of the pushing protrusions 312, 322, 312A, 322A of the corresponding sliders 31, 32, 31A, 32A, the resilient elements 35, 35A push the first and second sliders 31, 32, 31A, 32A back. Thus, the pushing pins 21, 21A of the sliding frame 20, 20A are held at the other sides of the pushing protrusions 312, 322, 312A, 322A of the first and second sliders 31, 32, 31A, 32A, and the upper casing 3 and the lower casing 2 of the portable device are open relatively to each other.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sliding hinge comprising
   a stationary frame;
   a sliding frame mounted on the stationary frame and having
      an inner surface corresponding to the stationary frame; and
      at least one pushing pin mounted on the inner surface of the sliding frame; and
   a resilient positioning assembly mounted on the stationary frame, disposed between the stationary frame and the sliding frame and having
      a mounting bracket mounted securely on the stationary frame and having
         at least one side surface corresponding to the at least one pushing pin of the sliding frame; and
         multiple mounting recesses formed in the at least one side surface of the mounting bracket;
      a first slider mounted on one of the at least one side surface of the mounting bracket, disposed between the mounting bracket and the at least one pushing pin and having
         multiple mounting rods separately protruding from a side surface of the first slider and mounted respectively in the mounting recesses of the mounting bracket; and
         a pushing protrusion formed on another side surface of the first slider and abutting the corresponding pushing pin of the sliding frame; and
      multiple resilient elements mounted respectively around the mounting rods of the first slider, and each resilient element having two ends respectively abutting the mounting bracket and the first slider.

2. The sliding hinge as claimed in claim 1, wherein
   the sliding frame has two pushing pins;
   the mounting bracket of the resilient positioning assembly is disposed between the pushing pins of the sliding frame and has two opposite side surfaces respectively corresponding to the pushing pins;
   the mounting recesses of the mounting bracket are formed in the side surfaces of the mounting bracket;
   the resilient positioning assembly further has a second slider, the first slider and the second slider are mounted respectively on the side surfaces of the mounting bracket and are disposed respectively between the mounting bracket and the pushing pins, and the second slider has multiple mounting rods separately protruding from a side surface of the second slider and mounted respectively in the mounting recesses of the mounting bracket; and
   a pushing protrusion formed on another side surface of the second slider and abutting a corresponding pushing pin of the sliding frame;
   the resilient elements of the resilient positioning assembly are mounted respectively around the mounting rods of the first and second sliders, and the ends of each resilient element respectively abutting the mounting bracket and a corresponding slider.

3. The sliding hinge as claimed in claim 2, wherein
   the stationary frame has two sliding slots formed separately through the stationary frame; and
   the pushing pins of the sliding frame are slidably mounted respectively through the sliding slots of the stationary frame.

4. The sliding hinge as claimed in claim 3, wherein
   the stationary frame further has at least one guiding recess formed on at least one side edge of the stationary frame and being parallel to the sliding slots of the stationary frame; and
   the sliding frame further has at least one guiding protrusion formed on at least one side edge of the sliding frame and mounted slidably in the at least one guiding recess of the stationary frame.

5. The sliding hinge as claimed in claim 4, wherein
   the stationary frame further has at least one positioning portion formed on the stationary frame and disposed between the sliding slots; and
   the mounting bracket of the resilient positioning assembly further has at least one positioning portion formed on a lower surface of the mounting bracket and engaging the at least one positioning portion of the stationary frame.

6. A sliding hinge comprising
   a stationary frame;
   a sliding frame mounted on the stationary frame and having
      an inner surface corresponding to the stationary frame; and
      at least one pushing pin mounted on the inner surface of the sliding frame; and
   a resilient positioning assembly mounted on the stationary frame, disposed between the stationary frame and the sliding frame and having
      a first slider mounted slidably on the stationary frame and having
         multiple mounting rods separately protruding from a side surface of the first slider; and
         a pushing protrusion formed on another side surface of the first slider and abutting a corresponding pushing pin of the sliding frame;
      a second slider mounted slidably on the stationary frame; and
      multiple resilient elements mounted respectively around the mounting rods of the first slider, and each resilient element having two ends respectively abutting the first and second sliders.

7. The sliding hinge as claimed in claim 6, wherein
   the sliding frame has two pushing pins;
   the second slider of the resilient positioning assembly has
      multiple mounting rods separately protruding from a side surface of the second slider; and
      a pushing protrusion formed on another side surface of the second slider and abutting a corresponding pushing pin of the sliding frame; and
   the resilient elements of the resilient positioning assembly are mounted respectively around the mounting rods of the first and second sliders, and the ends of each resilient element respectively abutting the first and second sliders.

8. The sliding hinge as claimed in claim 7, wherein
the stationary frame has multiple guiding slots formed separately through the stationary frame;
the first slider of the resilient element has at least one sliding protrusion formed on a bottom of the first slider and mounted slidably in at least one corresponding guiding slot of the stationary frame; and
the second slider of the resilient element has at least one sliding protrusion formed on a bottom of the second slider and mounted slidably in at least one corresponding guiding slot of the stationary frame.

9. The sliding hinge as claimed in claim 8, wherein
the stationary frame further has two sliding slots formed separately through the stationary frame;
the guiding slots of the stationary frame are disposed between the sliding slots of the stationary frame, and each guiding slot extending perpendicular to the sliding slots of the stationary frame; and
the pushing pins of the sliding frame slidably mounted respectively through the sliding slots of the stationary frame.

10. The sliding hinge as claimed in claim 9, wherein
the stationary frame further has at least one guiding recess formed on at least one side edge of the stationary frame and extending parallel to the sliding slots of the stationary frame;
the sliding frame further has at least one guiding protrusion formed on at least one side edge of the sliding frame and mounted slidably in the at least one guiding recess of the stationary frame.

11. A portable device with a sliding hinge as claimed in claim 6 comprising
a lower casing;
an upper casing;
the stationary frame of the sliding hinge is attached securely to the lower casing of the portable device; and
the sliding frame of the sliding hinge is attached securely to the upper casing of the portable device.

12. The portable device with the sliding hinge as claimed in claim 11, wherein
the sliding frame has two pushing pins;
the second slider of the resilient positioning assembly has multiple mounting rods separately protruding from a side surface of the second slider; and
a pushing protrusion formed on another side surface of the second slider and abutting a corresponding pushing pin of the sliding frame; and
the resilient elements of the resilient positioning assembly are mounted respectively around the mounting rods of the first and second sliders, and the ends of each resilient element respectively abutting the first and second sliders.

13. The portable device with the sliding hinge as claimed in claim 12, wherein
the stationary frame has multiple guiding slots formed separately through the stationary frame;
the first slider of the resilient element has at least one sliding protrusion formed on a bottom of the first slider and mounted slidably in at least one corresponding guiding slot of the stationary frame; and
the second slider of the resilient element has at least one sliding protrusion formed on a bottom of the second slider and mounted slidably in at least one corresponding guiding slot of the stationary frame.

14. The portable device with the sliding hinge as claimed in claim 13, wherein
the stationary frame further has two sliding slots formed separately through the stationary frame;
the guiding slots of the stationary frame are disposed between the sliding slots of the stationary frame, and each guiding slot extending perpendicular to the sliding slots of the stationary frame; and
the pushing pins of the sliding frame slidably mounted respectively through the sliding slots of the stationary frame.

15. The portable device with the sliding hinge as claimed in claim 14, wherein
the stationary frame further has at least one guiding recess formed on at least one side edge of the stationary frame and extending parallel to the sliding slots of the stationary frame;
the sliding frame further has at least one guiding protrusion formed on at least one side edge of the sliding frame and mounted slidably in the at least one guiding recess of the stationary frame.

* * * * *